United States Patent [19]

Wheeldon

[11] Patent Number: 4,502,595
[45] Date of Patent: Mar. 5, 1985

[54] CONVEYING AND LIKE STRUCTURES

[75] Inventor: John B. Wheeldon, Blackburn, England

[73] Assignee: Scapa-Porritt Limited, Blackburn, England

[21] Appl. No.: 459,484

[22] Filed: Jan. 20, 1983

Related U.S. Application Data

[63] Continuation of Ser. No. 141,300, Apr. 18, 1980, abandoned.

[30] Foreign Application Priority Data

Apr. 21, 1979 [GB] United Kingdom ............... 7913962
May 5, 1979 [GB] United Kingdom ............... 7915733

[51] Int. Cl.³ ........................................... B65G 17/06
[52] U.S. Cl. .................................. 198/853; 198/844; 162/348
[58] Field of Search ............. 198/688, 848, 849, 851, 198/853, 847, 643, 844; 140/3 R, 3 A, 3 C, 92.5; 245/4, 5, 9, 11, 6; 139/383 A, 383 AA; 162/348, 358, DIG. 1

[56] References Cited

U.S. PATENT DOCUMENTS

| | | | |
|---|---|---|---|
| 1,358,632 | 11/1920 | Grant | 198/643 |
| 1,992,883 | 2/1935 | Pink | 198/848 |
| 2,628,706 | 11/1953 | Guba | 198/848 |
| 2,740,615 | 4/1956 | Scholl | 198/844 |
| 2,912,098 | 11/1959 | Manes et al. | 198/849 |
| 3,308,856 | 3/1967 | Ploss | 140/71 |
| 3,427,958 | 2/1969 | Glasson | 198/688 |
| 3,608,702 | 9/1971 | Fraioli | 198/847 |

FOREIGN PATENT DOCUMENTS

| | | | |
|---|---|---|---|
| 2419751 | 4/1975 | Fed. Rep. of Germany | 162/348 |
| 577699 | 3/1926 | France | 198/848 |

Primary Examiner—Joseph E. Valenza
Attorney, Agent, or Firm—Fleit, Jacobson, Cohn & Price

[57] ABSTRACT

A link conveyor is proposed which includes a first set of helical coils or spirals connected together in interdigitated parallel disposition to define a base structure providing adequate strength and dimensional stability in the conveyor and a second set of interdigitated helical coils or spirals connected together and to the base structure and forming a supplementary structure for protecting the said base structure against damage or undue wear. The base and supplementary structures may be arranged to form a single layer conveyor or may comprise two separate plies connected together by support coils to define a Duplex structure. The conveyor is of particular application to papermachine clothing suitable for dryer fabrics, forming fabrics and base structures for press felts.

7 Claims, 11 Drawing Figures

CONVEYING AND LIKE STRUCTURES

This is a continuation of application Ser. No. 141,300 filed Apr. 18, 1980, now abandoned.

The invention concerns conveyors and like structures and has more particularly reference to structures formed from a multiplicity of spiral elements joined together in interdigitated side-by-side disposition.

In the context of papermachine clothing, with which field the present application is particularly, though not exclusively, concerned, it has been proposed to provide a papermachine felt comprising a multiplicity of spiral elements of synthetic monofilament material joined together in interdigitated disposition by hinge pins.

The object of the invention is to provide a structure, hereinafter for convenience referred to as a 'link conveyor', which term includes structures for use in the context of papermachine clothing suitable for dryer fabrics, forming fabrics or base structures for press felts, in which the effect of wear or damage on the strength of the conveyor in its running direction is lessened.

According to the present invention a link conveyor including a base structure defined by a respective plurality of spirals hingedly connected together in parallel interdigitated disposition and providing adequate strength in the running direction of the conveyor is characterised by a supplementary structure comprising a further respective plurality of spirals connected together in parallel interdigitated disposition and connected with the base structure, the supplementary structure being adapted and arranged to protect the base structure against wear.

According to a preferred feature, adjacent spirals of the base structure and the supplementary structure, respectively, are connected together by respective hinge wires.

According to a further preferred feature, the spirals of one at least of the base structure and the supplementary structure comprise synthetic yarns.

According to a further preferred feature, the spirals of the supplementary structure are of enhanced abrasion resistance in relation to the abrasion resistance of the spirals of the base structure.

According to another preferred feature, the spirals of the supplementary structure extend outwardly of the base structure at each face thereof.

According to a still further preferred feature, adjacent ones of individual pairs of spirals of the supplementary structure are secured together and the base structure and supplementary structure are connected together by pintle wires of the base structure.

The invention will now be described further, by way of example only, with reference to the accompanying drawings in which.

Figure 1:
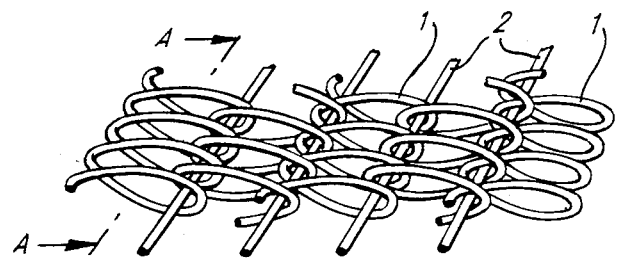
FIG. 1 is a diagrammatic perspective view of a part of a known link felt.
Figure 1A:
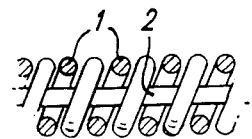
FIG. 1a is a section on line A—A of FIG. 1.

Referring now to the drawings, and more particularly to FIGS. 1 and 1a thereof, a conventional link conveyor comprises a plurality of individual spirals 1 of synthetic monofilament yarns arranged in interdigitated disposition, adjacent spirals being of opposite hand and being connected together by respective pintle wires 2 threaded through the tunnel formed thereby.

Figure 2:
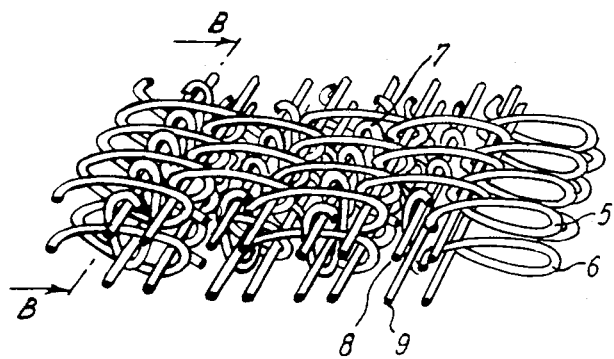
FIG. 2 is a perspective view of a part of the first embodiment of the invention.
Figure 2A:
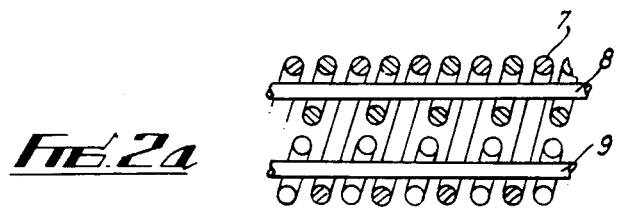
FIG. 2a is a section on line B—B of FIG. 2.

In a first, and preferred, embodiment of the present invention, see now FIGS. 2 and 2a, the link conveyor is in the form of a Duplex fabric and comprises a base structure defined by a plurality of individual synthetic monofilament spirals 5 joined in interdigitated parallel disposition by respective pintle wires connecting adjacent spirals arranged in combination with a supplementary structure of like form and similarly made up of individual synthetic monofilament spirals 6, the two structures being secured together in overlying disposition by support spirals 7 interdigitated with corresponding spirals 5, 6 of the base and supplementary structures and secured thereto by respective pintle wires 8 and 9, the support spirals 7 being arranged in spaced parallel disposition in the longitudinal, that is running, direction of the conveyor. Corresponding overlying spirals of the respective structures are of like hand, whilst successive spirals in the individual layers are alternately of right and left hand, the support spirals being of opposite hand so that of the spirals which they connect together.

The supplementary structure will be provided at the roller side of the composite structure, and will accordingly be subjected to wear and abrasion. Any failure of the supplementary structure such as might arise from wear will not adversely affect the integrity of the total structure since adequate strength in the longitudinal direction of the conveyor is provided by the base structure at one side of such total structure.

Figure 3:
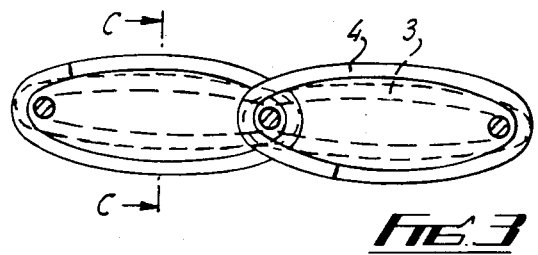
FIG. 3 is a side elevation of a part of a second embodiment of the invention.
Figure 3A:
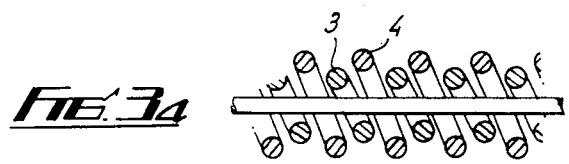
FIG. 3a is a section taken on line C—C of FIG. 3.

A second embodiment of the invention is illustrated in FIGS. 3 and 3a and will be seen to comprise a base structure, defined by synthetic monofilament spirals 3, and a supplementary structure, defined by synthetic monofilament spirals 4, having common pintle wires whereby adjacent spirals of both structures are connected together.

In order to provide for increased abrasion resistance of the total structure the spirals 3 which constitute the base structure may initially be of like dimensions to those of the supplementary structure but differ therefrom in that upon heat stabilisation, the coils of the base structure assume a lesser vertical dimension, as seen in the drawing, than the supplementary structure. Alternatively, the spirals of the supplementary structure may be produced from a yarn of a greater diameter than those of the base structure, thereby to ensure that the supplementary structure extends outwardly of and protects the base structure, which latter structure imparts a necessary degree of strength to the composite felt. It is to be observed, however, the presence of pairs of coaxially arranged spirals of similar outside dimensions does of itself improve the effective life of the conveyor in that failure of one spiral of a related pair thereof may not destroy the integrity of the conveyor.

As in the case of the embodiment shown in FIGS. 2 and 2a, alternate spirals both of the base structure and the supplementary structure are of opposite hand.

Figure 4:
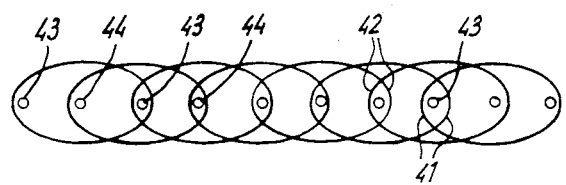
FIG. 4 is a diagrammatic side elevation showing a third embodiment of the invention.
Figure 5:
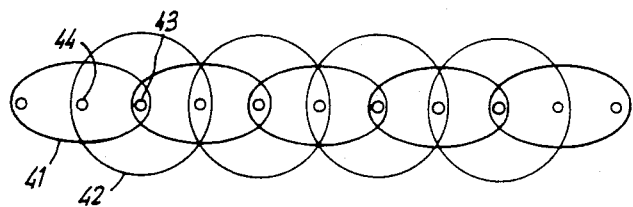
FIG. 5 is a view corresponding to FIG. 4 and illustrates a modification of the arrangement shown therein.

FIGS. 4 and 5 show two further embodiments wherein the link conveyor comprises base and supplementary structures 41, 42 so arranged as to provide a single layer conveyor structure, the two structures each having respective sets of pintle wires 43, 44 with the wires of one set 43 being offset in relation to those of the other 44. One of the interlinked structures provides the necessary degree of strength and dimensional stability, whilst the other may be of improved abrasion resistance. Alternatively and particularly, in the case of the embodiment of FIG. 4, the increased abrasion resistance may arise merely from the increased yarn cover at the relevant surface of the conveyor due to the presence of the supplementary structure. In the case of the embodiment of FIG. 5, the spirals of the supplementary structure 42 are of larger diameter, and thereby protect the spirals of the base structure 41.

Figure 6:
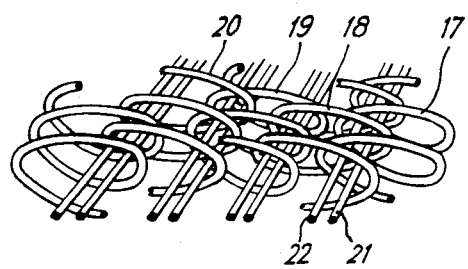
FIG. 6 is a perspective view of a still further embodiment of the invention.

A modification to the prior art conveyor shown in FIG. 1 is illustrated in FIG. 6, the arrangement shown therein having two pintle wires 21, 22 at each hinge point thereby to draw the spirals 17,18,19,20 closer together and hence produce a less permeable structure than would otherwise be the case. The greater amount of yarn per unit area increases the abrasion resistance of the conveyor. The inclusion of more pintle wires at each junction than the two specifically shown produces a means whereby the permeability of the conveyor might be further reduced.

Figure 7:
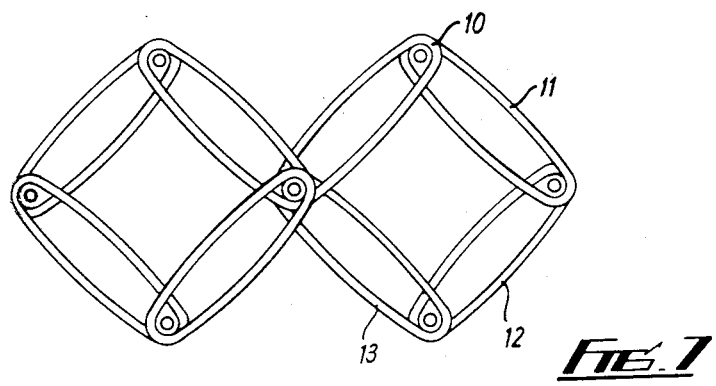
FIG. 7 is a diagrammatic illustration of a fifth embodiment of the invention.
Figure 8:
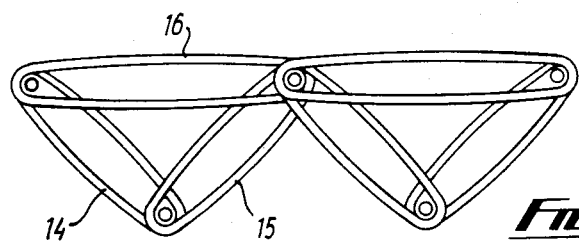
FIG. 8 is a view corresponding to FIG. 7 and shows a still further embodiment of the invention.

As an alternative to the Duplex fabric shown in FIG. 2, the invention allows of the production of a link conveyor in accordance with FIG. 7 or 8.

In the arrangement shown in FIG. 7, two sets of hingedly connected spirals 10,11 and 12, 13 are joined together at intervals by pintle wires common to both sets, one set of spirals constituting the base structure and providing the dimensional stability and strength characteristic of the conveyor, and the other set of spirals providing a wear-resistant supplementary structure to protect the base structure against wear and damage. In the use condition of the conveyor the open configuration illustrated will not obtain, but rather the upper and lower structures will move closer together in the region of the free apices of the open rectangular formation shown. It is to be observed that the upper surface can assist in the conveyance of articles or materials placed thereon by virtue of the transversely ribbed configuration arising from the disposition of the spirals whereas the similar undersurface can co-operate with, say, the ribbed or similar surface of a drive roller to provide a positive drive to the conveyor.

FIG. 8 illustrates a modification of the arrangement shown in FIG. 7, wherein the pintle wires of one structure, as defined by spirals 16, constitute alternate pintle wires of the other structure as defined by spirals 14, 15, the intermediate hinge points of the said other structure being defined by pintle wires unique to that other structure.

In the case of the embodiments shown in FIGS. 2, 3 and 6, it is thought preferable that alternate spirals in the or in each respective layer be of opposite hand. However, whilst such arrangement is convenient in that it does much facilitate the assembly of those conveyors of the kind to which the invention relates wherein corresponding parts of the successive turns of adjacent spirals are in closely spaced disposition on the common pintle wire, the invention is not limited to this feature of opposite handedness. It may be found convenient, in some applications, for the said corresponding parts to be more widely spaced or for the adjacent spirals to be forced into engagement, in which case adjacent coils can be of like hand. The combination of spirals, as to their handedness, will be determined by reference to the specific requirements of the conveyor and the detailed construction thereof. In any event, the heat setting process to which a conveyor constructed from synthetic monofilament yarns is necessarily subjected will relieve any stresses imparted into the structure from any distortions created on assembly of seemingly noncompatible spirals.

The invention herein disclosed provides a range of link conveyors of application to a range of industries, wherein the specific requirements of the conveyor as regards strength, stability and wear resistance can readily be achieved by suitable selection of materials and dimensions of the individual spirals. The facility with which the permeability of the structure might be varied to meet specific requirements lends such structure to ready application as a filter medium, drainage mat or the like, and the term "conveyor" is to be construed accordingly. A particular application of the conveyor herein disclosed is in the context of papermachine and like clothing, this being especially so of the embodiments disclosed in FIGS. 2 to 4 and FIG. 6. Other applications are seen to lie in the food and allied industries.

Whilst the invention has been disclosed in connection with spirals of synthetic monofilament yarns, other materials, including metallic materials, may be preferred in some instances, as indeed may combinations of spirals of metallic and non-metallic materials. In so far as synthetic yarns are concerned, the preferred material of choice is clearly monofilament, although resin treated or otherwise coated continuous multifilament yarns have been found to be of application.

The invention is not restricted to the exact features of the embodiments hereinbefore described. For example, it is not essential that adjacent spirals be connected together by pintle wires threaded through the interdigitated turns of such spirals, since pairs of spirals of like hand can be connected by mutual engagement in parallel side-by-side disposition simply by pushing one spiral laterally through the other until the oppositely inclined turns contact, and the disclosure and claims hereof must be construed accordingly. Furthermore, whilst complete spirals for the base and supplementary structures are preferred, a like effect is attainable in some instances by replacing the spirals of the supplementary structure, or the support spirals of the FIG. 2 embodiment by a multiplicity of rings.

I claim:

1. A link conveyor comprising: a base structure defined by a respective plurality of spirals of a synthetic plastics material hingedly connected together in parallel interdigitated disposition to provide a conveyor having adequate strength in the running direction thereof, and a supplementary structure likewise comprising a respective plurality of spirals arranged together in parallel interdigitated disposition and constituting a coherent whole with the base structure, the supplementary structure being coextensive with the said base structure in the longitudinal direction thereof and the spirals of said supplementary structure being of increased abrasion resistance in relation to those of the base structure and extending outwardly of the base structure at each face thereof to protect the base structure against wear at those surfaces.

2. A link conveyor as claimed in claim 1, wherein adjacent spirals of the base structure and the supplementary structure, respectively, are connected together by respective hinge wires.

3. A link conveyor as claimed in claim 2, wherein the spirals both of the base structure and the supplementary structure comprise synthetic yarns.

4. A link conveyor as claimed in claim 2, wherein the synthetic yarn comprises a plastic monofilament.

5. A link conveyor as claimed in claim 1, wherein corresponding spirals of the base structure and the supplementary structure are arranged coaxially as a two-start spiral.

6. A link conveyor as claimed in claim 5, wherein the spiral of the supplementary structure is of a material of a greater thickness than that of the base structure spiral.

7. A link conveyor as claimed in claim 1, wherein adjacent ones of individual pairs of spirals of the supplementary structure are secured together and the spirals of the supplementary structure are connected to the base structure by pintle wires of the base structure.

* * * * *